United States Patent
Maeda et al.

(10) Patent No.: US 10,325,162 B2
(45) Date of Patent: Jun. 18, 2019

(54) DETECTION DEVICE AND DETECTION METHOD

(71) Applicant: Panasonic Intellectual Property Management Co., Ltd., Osaka (JP)

(72) Inventors: Masakatsu Maeda, Kanagawa (JP); Hirofumi Nishimura, Kanagawa (JP); Takahiro Shima, Kanagawa (JP); Naoya Yosoku, Kanagawa (JP); Yoshito Hirai, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 210 days.

(21) Appl. No.: 15/594,038

(22) Filed: May 12, 2017

(65) Prior Publication Data

US 2017/0337432 A1 Nov. 23, 2017

(30) Foreign Application Priority Data

May 19, 2016 (JP) .................. 2016-100674

(51) Int. Cl.
| | | |
|---|---|---|
| *G06K 9/00* | (2006.01) | |
| *G01S 13/04* | (2006.01) | |
| *G01S 13/93* | (2006.01) | |
| *G08G 1/16* | (2006.01) | |

(52) U.S. Cl.
CPC ........ *G06K 9/00791* (2013.01); *G01S 13/04* (2013.01); *G01S 13/931* (2013.01); *G06K 9/00798* (2013.01); *G08G 1/166* (2013.01); *G01S 2013/9375* (2013.01)

(58) Field of Classification Search
CPC ............ G06K 9/00791; G06K 9/00798; G01S 13/04; G01S 13/931; G01S 2013/9375; G08G 1/166
See application file for complete search history.

(56) References Cited

U.S. PATENT DOCUMENTS

| | | | | |
|---|---|---|---|---|
| 7,110,570 | B1* | 9/2006 | Berenz | ............... B60R 25/25 |
| | | | | 382/104 |
| 2005/0123173 | A1* | 6/2005 | Isaji | .................. B60W 10/18 |
| | | | | 382/104 |
| 2008/0204557 | A1* | 8/2008 | Kubota | ............... B60R 1/00 |
| | | | | 348/148 |

(Continued)

FOREIGN PATENT DOCUMENTS

JP 2013-186663 A 9/2013

*Primary Examiner* — Oschta I Montoya
(74) *Attorney, Agent, or Firm* — Seed IP Law Group LLP

(57) ABSTRACT

There is provided a detection device that includes: a position estimator that estimates a candidate position of a crosswalk in a movement direction of a vehicle and estimates a length of the crosswalk and an intersecting angle between the crosswalk and a roadway using the candidate position; a corrector that corrects the numbers of periods and widths of two basis functions based on the estimated length of the crosswalk and the estimated intersecting angle, the two basis functions corresponding to intervals of white lines of the crosswalk and are orthogonal to each other; and a crosswalk detector that detects whether or not the crosswalk is present using both image data which include the candidate position and the two corrected basis functions.

8 Claims, 8 Drawing Sheets

(56) References Cited

U.S. PATENT DOCUMENTS

| | | | |
|---|---|---|---|
| 2012/0182140 A1* | 7/2012 | Kumabe | G08G 1/161 340/435 |
| 2013/0144474 A1* | 6/2013 | Ricci | H04W 4/90 701/22 |
| 2015/0248763 A1* | 9/2015 | Kumano | G06T 7/73 382/203 |
| 2015/0334269 A1* | 11/2015 | Yokota | G06K 9/00805 382/103 |
| 2016/0261848 A1* | 9/2016 | Sekiguchi | B60R 1/00 |
| 2017/0030538 A1* | 2/2017 | Geisler | F21S 8/083 |
| 2017/0148327 A1* | 5/2017 | Sim | G08G 1/167 |
| 2017/0232964 A1* | 8/2017 | Moritani | B60T 7/22 701/70 |
| 2018/0151075 A1* | 5/2018 | Claesson | G08G 1/09623 |
| 2018/0247139 A1* | 8/2018 | Kaneko | G06T 7/11 |

\* cited by examiner

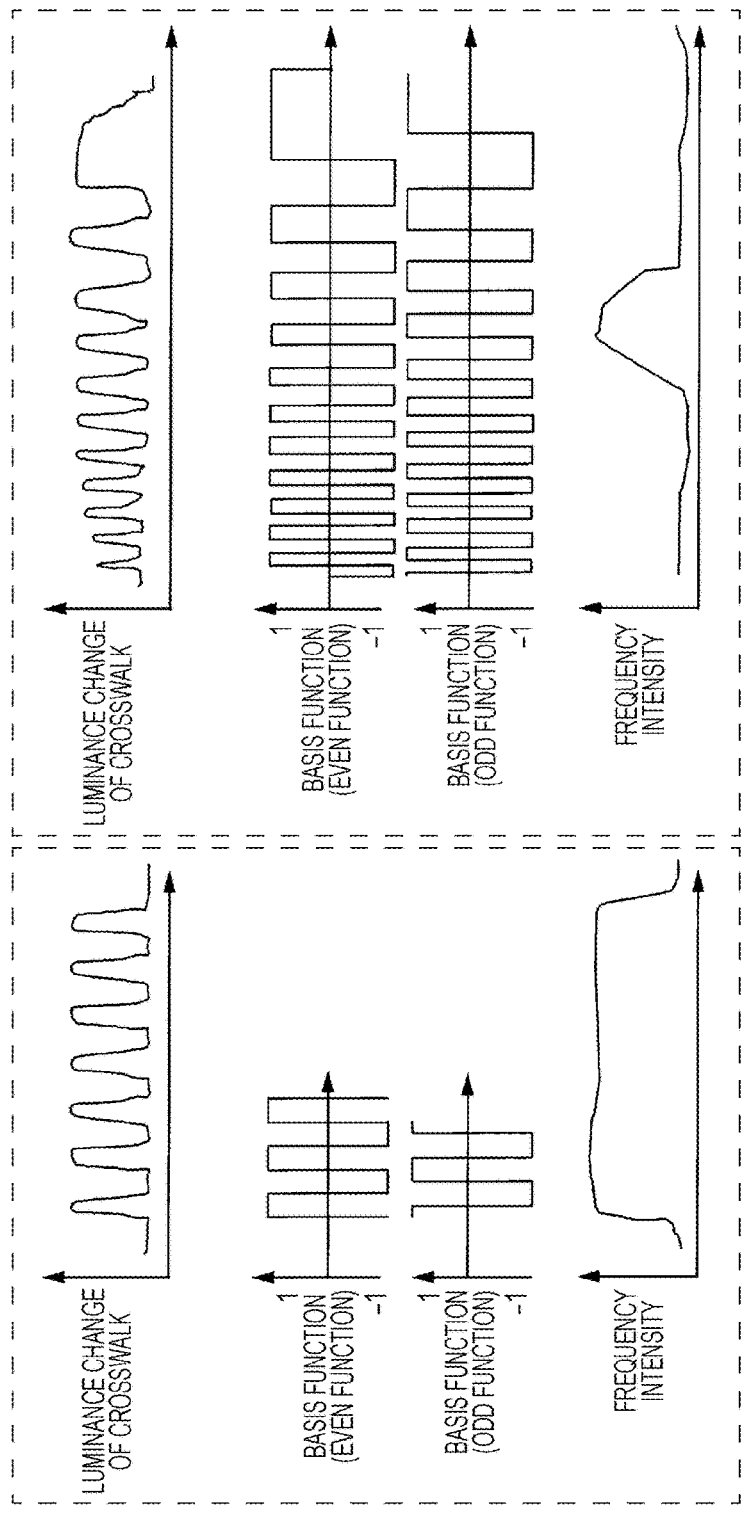

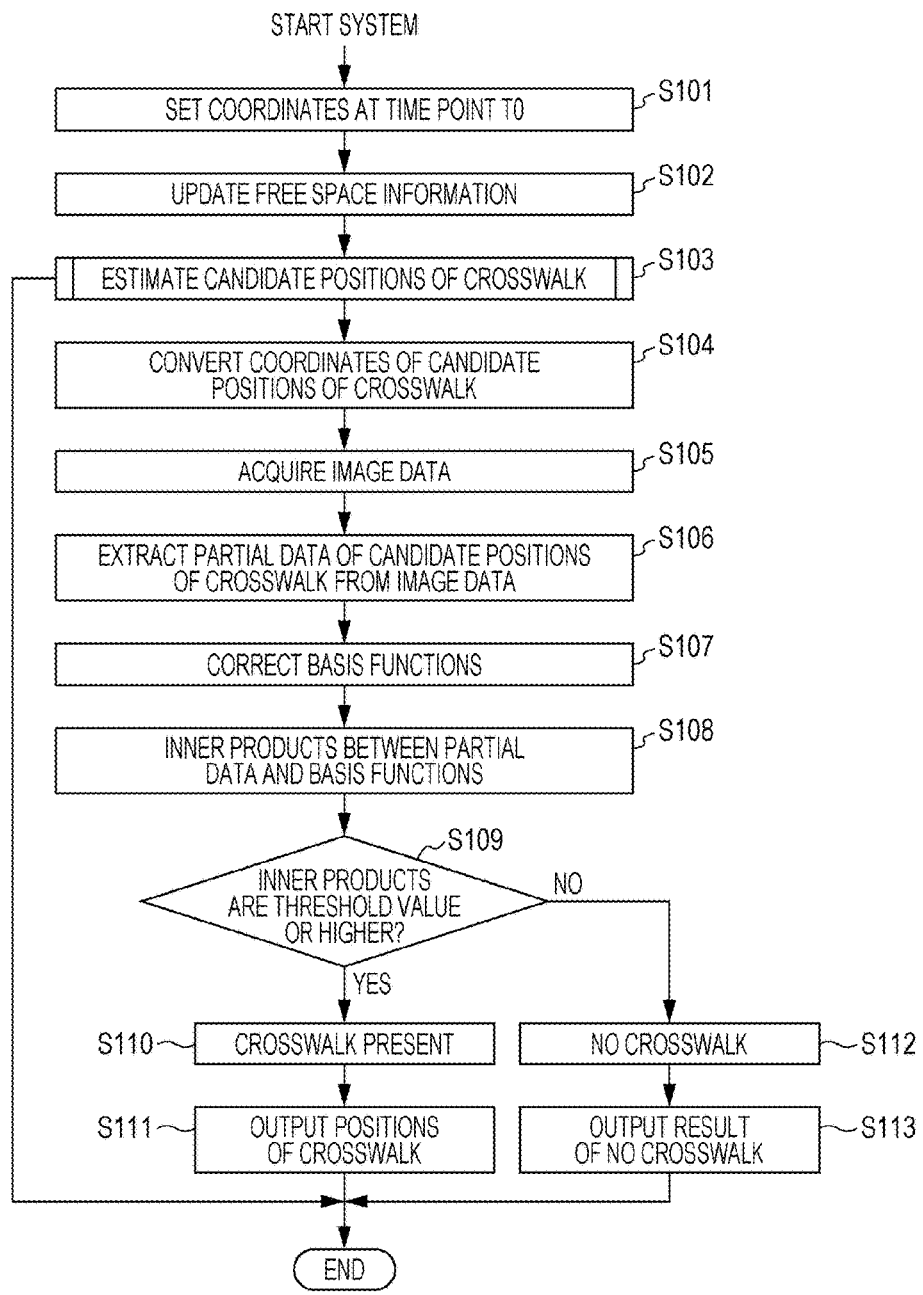

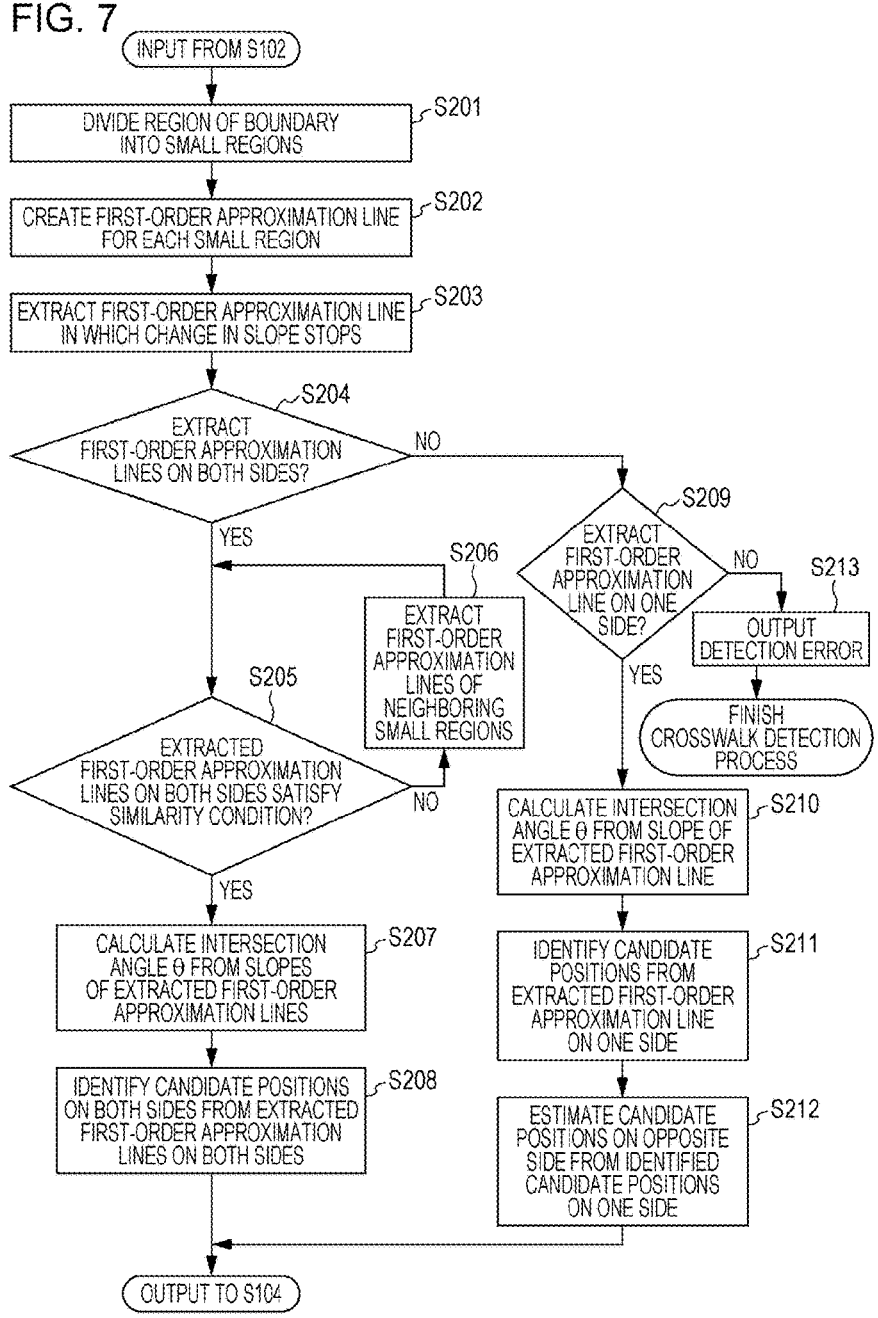

DETECTION DEVICE AND DETECTION METHOD

BACKGROUND

1. Technical Field

The present disclosure relates to a detection device that is to be installed in a vehicle and a detection method for detecting a crosswalk on a road surface on which a vehicle travels.

2. Description of the Related Art

In recent years, there has been an automatic braking system that detects an object (for example, a vehicle or a pedestrian) around a vehicle by using a camera, a sonar, a radar (for example, a millimeter-wave radar), and so forth and thereby decelerates the vehicle in order to avoid a collision with the object. Further, there has been a warning system that detects an object around the vehicle and thereby notifies a driver of a possibility of a collision with an object. Those systems contribute to prevention of accidents of vehicles.

Those system limit operational conditions of the systems by using various sensors in order to reduce malfunctioning and to improve performance.

For example, performance of the system may be improved by recognizing a crosswalk on a road surface by use of various sensors and by limiting or prioritizing the operational conditions such that a pedestrian or a vehicle around the recognized crosswalk is detected. Thus, the crosswalk is detected with high accuracy, and an improvement in performance of the system may thereby be expected.

Japanese Unexamined Patent Application Publication No. 2013-186663 discloses a device that recognizes the change in luminance (the intensities of luminance) that corresponds to stripes (white lines that are periodically arranged) of the crosswalk by using a monocular camera installed in a vehicle in the horizontal direction and the vertical direction and thereby detects the crosswalk.

However, in the techniques disclosed in Japanese Unexamined Patent Application Publication No. 2013-186663, when the vehicle that enters an intersection photographs the crosswalks that are present in right-turn and left-turn directions by the camera installed in the vehicle, the intervals among the stripes of the crosswalks that are present in the right-turn and left-turn directions appear narrow. Thus, the change in the intensities of luminance that correspond to the stripes of the crosswalks has to be recognized by using a high resolution camera, and high-load signal processing has to be performed.

SUMMARY

One non-limiting and exemplary embodiment facilitates providing a detection device and a detection method that may avoid an increase in a load in signal processing and may detect a position of a crosswalk in a short time.

In one general aspect, the techniques disclosed here feature a detection device including: a distance-bearing sensor that transmits an electromagnetic wave and receives the electromagnetic wave that is reflected from an object; a position estimator that estimates, based on the received electromagnetic wave, at least one candidate position of a crosswalk in a movement direction of a vehicle and estimates a length of the crosswalk and an intersecting angle between the crosswalk and a roadway using the candidate position; a corrector that corrects the numbers of periods and widths of two basis functions based on the estimated length of the crosswalk and the estimated intersecting angle, the two basis functions corresponding to intervals of white lines of the crosswalk and being orthogonal to each other; and a crosswalk detector that detects whether or not the crosswalk is present using both image data which include the candidate position and the two corrected basis functions.

It should be noted that general or specific embodiments may be implemented as a system, a method, an integrated circuit, a computer program, a storage medium, or any selective combination thereof.

One aspect of the present disclosure may avoid an increase in a load in signal processing and may detect a position of a crosswalk in a short time.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5A illustrates one example of a spatial frequency analysis in the embodiment of the present disclosure;

FIG. 5B illustrates one example of the spatial frequency analysis in the embodiment of the present disclosure;

FIG. 6 illustrates one example of a crosswalk detection process in the embodiment of the present disclosure; and FIG. 7 illustrates one example of an estimation process of the candidate positions of the crosswalk in the embodiment of the present disclosure.

DETAILED DESCRIPTION

The present disclosure relates to a detection device that is to be installed in a vehicle and a detection method for detecting a crosswalk on a road surface on which a vehicle travels.

Figure 1:
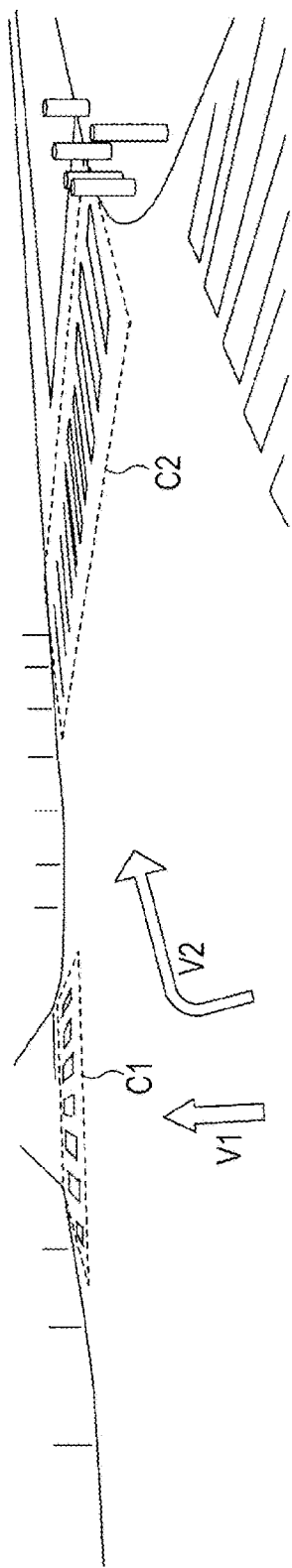
FIG. 1 illustrates one example of a field of view in front of a vehicle in an intersection.

FIG. 1 illustrates one example of a field of view in front of a vehicle in an intersection. FIG. 1 illustrates a crosswalk C1 that is present in a straight movement direction (arrow V1) of the vehicle and a crosswalk C2 that is present in a right-turn direction (arrow V2) of the vehicle. In the techniques disclosed in Japanese Unexamined Patent Application Publication No. 2013-186663, an image as illustrated in FIG. 1 is photographed by a camera installed in the vehicle, the change in luminance (the intensities of luminance) that corresponds to stripes of the crosswalks is recognized, and the positions of the crosswalks in the image are thereby detected.

Because the intervals of the stripes of the crosswalk C1 are comparatively wide, it is easy to recognize the change in luminance that corresponds to the stripes of the crosswalk C1 from the image illustrated in FIG. 1.

Because the crosswalk C2 is present not in just front but in oblique front of a movement direction of the vehicle, the intervals of the stripes become narrow compared to the crosswalk C1. Thus, unless photographing is performed by using a high resolution camera, it is difficult to recognize the change in luminance that corresponds to the stripes of the crosswalk C2 from the image illustrated in FIG. 1. Further, because the high resolution camera provides a large amount of data to be processed and the load in signal processing increases, the time that is requested for detection of the crosswalk extends. Further, the circuit scale becomes large.

Thus, the positions in which the crosswalk is present and the road shape are first estimated by a radar device. Then, a deformation state of the crosswalk that is photographed by the camera is estimated (a spatial frequency is analyzed) by using estimation results, and the crosswalk is thereby detected.

Focusing on a fact that this may avoid an increase in the load in the signal processing and may enable detection of the positions of the crosswalk in a short time lead to the present disclosure.

An embodiment of the present disclosure will hereinafter be described in detail with reference to drawings. Note that the embodiment described below is merely one example, and the present disclosure is not limited to the embodiment described below.

EMBODIMENT

Figure 2:
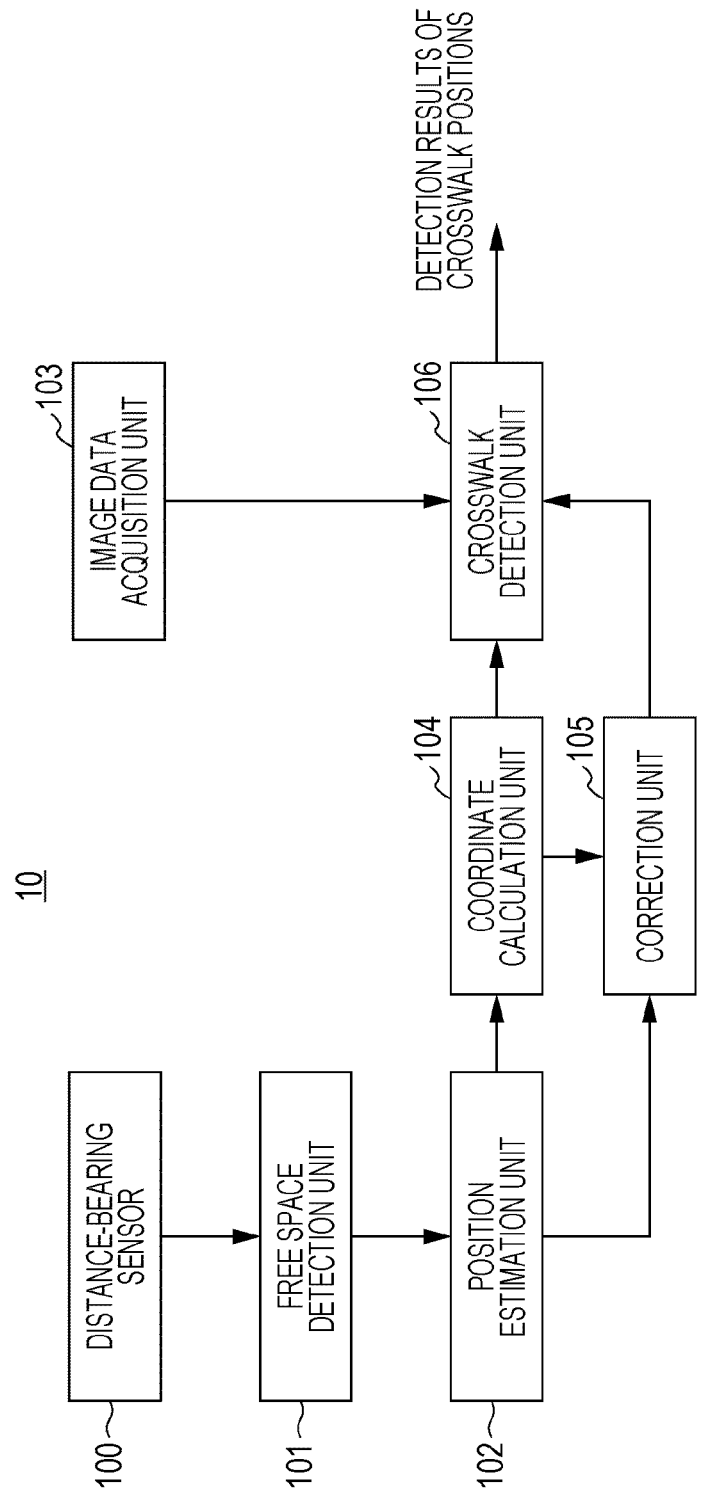
FIG. 2 illustrates one example of a configuration of a detection device according to an embodiment of the present disclosure.

FIG. 2 is a block diagram that illustrates one example of a configuration of a detection device 10 according to this embodiment. The detection device 10 is installed in a vehicle and detects a crosswalk that is present around the vehicle (for example, in the movement direction of the vehicle such as a front or a lateral side). As illustrated in FIG. 2, the detection device 10 has a distance-bearing sensor 100, a free space detection unit 101, a position estimation unit 102, an image data acquisition unit 103, a coordinate calculation unit 104, a correction unit 105, and a crosswalk detection unit 106.

The distance-bearing sensor 100 transmits an electromagnetic wave in each bearing of the vehicle and receives the electromagnetic wave that is reflected from an object which is present around the vehicle as a reflected wave. Then, the distance-bearing sensor 100 detects a reflection point based on the reflected wave that is received and generates reflection point information that indicates the detected reflection point for each frame. A frame is a unit of processing in the distance-bearing sensor 100.

For example, the distance-bearing sensor 100 measures a representative value (hereinafter referred to as "reflection intensity") of received power of the reflected wave with respect to each cell that is obtained by dividing a transmission direction of the electromagnetic wave from the distance-bearing sensor 100 and the distance from the distance-bearing sensor 100 by prescribed intervals. Then, the distance-bearing sensor 100 detects the cell that has the reflection intensity which is a prescribed threshold value or higher as the reflection point. Then, the distance-bearing sensor 100 detects the distance from the vehicle to the object, the direction of the object, and the relative velocity of the object to the velocity of the vehicle, as the reflection point information, based on the reflection point. The distance-bearing sensor 100 outputs the detected reflection point information to the free space detection unit 101 with respect to each of the frames.

The free space detection unit 101 uses the reflection point information to detect a boundary between the region in which the object is present and the region in which the object is not present around the vehicle with respect to each of the frames. The region in which the object is not present around the vehicle is a region in which the vehicle travels, that is, a roadway. That is, the boundary that is detected by the free space detection unit 101 is the boundary between the roadway and the outside of the roadway.

Specifically, the free space detection unit 101 detects the position of the reflection point whose distance from the distance-bearing sensor 100 is closest in each bearing in a detection range of the distance-bearing sensor 100, as a boundary point in each bearing, with respect to each of the frames.

Further, the free space detection unit 101 performs a conversion process for converting the boundary that is detected in past frames to the boundary in present frames and a smoothing process between the boundary detected in the past frames and the boundary in the present frames.

The free space detection unit 101 outputs the boundary in the present frames at a time after the conversion process and the smoothing process are performed to the position estimation unit 102 as free space information. The boundary in the present frames is represented by the coordinates in the same coordinate plane as the coordinate plane of the detection range of the distance-bearing sensor 100. For example, the coordinate plane (hereinafter referred to as a T0 coordinate plane) of the detection range of the distance-bearing sensor 100 is an X-Y plane that is substantially parallel to the road surface on which the vehicle travels.

See Japanese Patent Application No. 2015-198675 for details of the free space detection unit 101.

The position estimation unit 102 estimates a position as a candidate in which the crosswalk is present in the movement direction of the vehicle (hereinafter referred to as a candidate position of the crosswalk) based on output data of the distance-bearing sensor 100. Then, the position estimation unit 102 uses the estimated candidate positions of the crosswalk to estimate the length of the crosswalk and the intersecting angle between the crosswalk and the roadway. Specifically, the position estimation unit 102 creates plural first-order approximation lines based on the boundary in the present frames that is acquired from the free space detection unit 101, estimates the positions as the candidates in which the crosswalk is present (hereinafter referred to as the candidate positions of the crosswalk) from the first-order approximation lines, and uses the candidate positions of the crosswalk to estimate the length of the crosswalk and the intersecting angle between the crosswalk and the roadway. The position estimation unit 102 outputs estimation results to the coordinate calculation unit 104 and the correction unit 105. A method for estimating the candidate positions of the crosswalk in the position estimation unit 102, which will be described later, is outlined as follows.

In a section in which plural roads intersect such as an intersection, corner cut-off is performed for corners of edges of the roads (corners are trimmed roundly). The size of the corner cut-off is decided in accordance with the width of a sidewalk or the like. One of the purposes of the corner cut-off is to allow the vehicle to smoothly turn right or left without an extensive operation of a steering wheel by a driver. Further, another purpose of the corner cut-off is not to obstruct straight movement of the following vehicle even if the vehicle temporarily stops in front of the crosswalk when a pedestrian is crossing the crosswalk in a destination of the right or left turn of the vehicle. That is, in the section such as the intersection in which plural roads intersect, the corner cut-off is provided on the front side of the crosswalk when seen in the movement direction of the vehicle that is turning right or left.

Figure 3A:
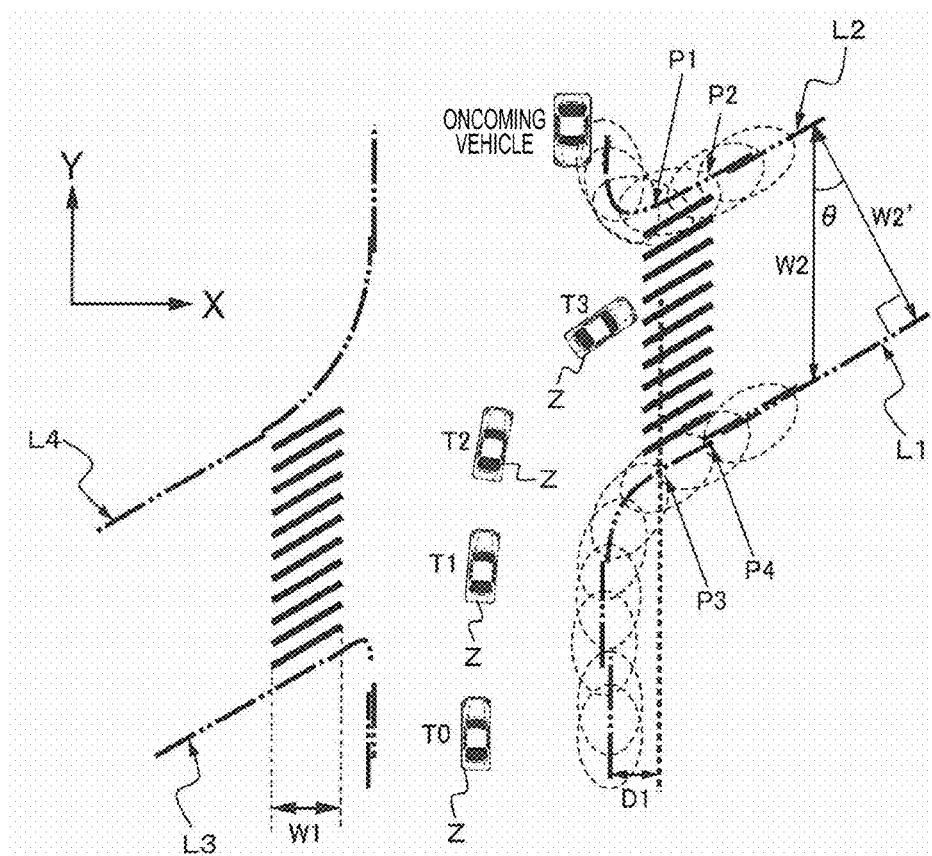
FIG. 3A illustrates one example of an estimation method of candidate positions of a crosswalk in the embodiment of the present disclosure.

Thus, the position estimation unit 102 in this embodiment sets a spot in which the slope of the first-order approximation line changes as the spot that corresponds to the position of the corner cut-off which is provided on the front side of the crosswalk and estimates the candidate positions of the crosswalk (coordinates P1 and P3 that are indicated in FIG. 3A) based on the spot in which the slope of the first-order approximation line changes.

Further, the crosswalk of the intersection at which roads intersect at a right angle is provided at a right angle to the roadway so that pedestrians safely cross the roadway. This is for purposes of shortening the time in which the pedestrian walks through the crosswalk and shortening the time in which the vehicle waits for a traffic signal. On the other hand, in the intersection in which roads do not intersect at a right angle, if the crosswalk is provided at a right angle to the roadway, the pedestrian has to make a detour to cross the crosswalk. Thus, it is possible that the pedestrian walks through the outside of the crosswalk in order to avoid a detour. This may cause a traffic safety problem. Thus, the crosswalk of the intersection in which the roads do not intersect at a right angle is not at a right angle to the roadway but is provided to be inclined in accordance with the intersecting angle of the intersection.

Thus, the position estimation unit 102 uses the slope of the first-order approximation line to calculate an intersecting angle θ of the roadway in the destination of the right turn and thereby calculates the angle of the crosswalk.

The image data acquisition unit 103 is provided in a front portion of the vehicle and acquires image data from a monocular camera (not illustrated) that photographs the front or the lateral side in front of the vehicle. The image data acquisition unit 103 outputs the image data to the crosswalk detection unit 106. The image data are data in the plane that is defined by the orientation of the monocular camera and the angle of view (hereinafter referred to as a camera coordinate plane), for example.

The coordinate calculation unit 104 performs the coordinate conversion for the candidate positions of the crosswalk that are acquired from the position estimation unit 102. Specifically, the coordinate calculation unit 104 converts the candidate positions of the crosswalk in the T0 coordinate plane to the coordinates in the camera coordinate plane for a process that uses the candidate positions of the crosswalk and the image data in the crosswalk detection unit 106. The coordinate conversion in the coordinate calculation unit 104 is executed by using a coordinate conversion process in related art. The coordinate calculation unit 104 outputs the candidate positions of the crosswalk that are converted to the camera coordinate plane to the correction unit 105 and the crosswalk detection unit 106.

The correction unit 105 has two basis functions that serve as references in the detection of the crosswalk. The two basis functions indicate intervals of white lines of the crosswalk and are orthogonal to each other. The correction unit 105 corrects the numbers of periods and widths of the two basis functions, in accordance with the length and the angle of the crosswalk that are indicated by the candidate positions of the crosswalk in the T0 coordinate plane and the length and the angle of the crosswalk that are indicated by the candidate positions, which are converted to the camera coordinate plane, of the crosswalk. The correction unit 105 outputs the two corrected basis functions to the crosswalk detection unit 106. A correction process of the basis function in the correction unit 105 will be described later.

The crosswalk detection unit 106 uses the image data that include the candidate positions of the crosswalk and the two corrected basis functions to detect whether or not the crosswalk is present. Specifically, the crosswalk detection unit 106 extracts the area that corresponds to the candidate positions of the crosswalk which are acquired from the coordinate calculation unit 104, as partial data, from the image data that are acquired from the image data acquisition unit 103. Then, the crosswalk detection unit 106 uses the extracted partial data and the two basis functions that are acquired from the correction unit 105 to perform the spatial frequency analysis for determining whether the periodic change in luminance that corresponds to the stripes of the crosswalk is present in the partial data.

As the spatial frequency analysis, the crosswalk detection unit 106 calculates respective inner products between the extracted partial data and the two basis functions that are acquired from the correction unit 105. Then, the crosswalk detection unit 106 determines that the crosswalk is present when the inner products are a prescribed threshold value or higher.

The crosswalk detection unit 106 outputs a determination result that indicates the positions of the crosswalk to a collision inhibition device or the like, which is not illustrated, for example. Alternatively, the crosswalk detection unit 106 causes a display unit or the like, which is not illustrated, to display the determination result that indicates the positions of the crosswalk, for example, and thereby calls attention of the driver. A detection process of the crosswalk in the crosswalk detection unit 106 will be described later.

Next, the method for estimating the candidate positions of the crosswalk in the position estimation unit 102 will be described.

FIG. 3A is a diagram that illustrates one example of an estimation method of the candidate positions of the crosswalk in this embodiment. FIG. 3A illustrates an example where the crosswalk that is present in the right-turn direction is detected when a vehicle Z that includes the detection device 10 enters the intersection from a lower part of FIG. 3A and turns right. Further, FIG. 3A illustrates boundaries L1 to L4 that are detected by the free space detection unit 101 and states of the vehicle Z at time points T0 to T3. The inside that is defined by the boundaries L1 to L4 corresponds to the roadways.

The position estimation unit 102 estimates coordinates P1 to P4 of four points that surround the crosswalk illustrated in FIG. 3A as the candidate positions of the crosswalk. Further, the position estimation unit 102 estimates a length W2 of the crosswalk, the intersecting angle θ between two roads that form the intersection, and a road width W2' of the roadway on which the crosswalk is provided.

The vehicle Z at the time point T0 is in a state of straight movement. The driver of the vehicle Z operates a direction indicator and starts a right turn at the time point T0 or later. In this case, the detection device 10 starts detecting the positions of the crosswalk that is present in a destination of the right turn. Then, the detection device 10 completes detection of the positions of the crosswalk by the time point T1.

If the driver finds a pedestrian or the like on the crosswalk and stops the vehicle Z immediately before the vehicle Z passes through the crosswalk in the destination of the right turn (for example, the time point T3), an accident with an oncoming vehicle possibly occurs. Thus, at an earlier time point (for example, the time point T2) than that, the driver performs a check on an oncoming vehicle and a check on a pedestrian or the like on the crosswalk in the destination of the right turn. Therefore, for example, before the time point T2, that is, in a phase of the time point T1, the detection of the positions of the crosswalk has to be completed.

The position estimation unit 102 decides the T0 coordinate plane from the positions of the vehicle Z at the time point T0. More specifically, the position estimation unit 102 decides the X-Y plane, of which the origin is the midpoint of rear wheels of the vehicle Z and the Y axis direction is the movement direction of the vehicle Z at the time point T0, and which is substantially parallel to a road surface on which the vehicle Z travels, as the T0 coordinate plane. Then, the position estimation unit 102 estimates the candidate positions P1 to P4 of the crosswalk in the T0 coordinate plane.

The boundaries L1 and L2 that are indicated in FIG. 3A are formed with line segments with non-uniform lengths or points due to an influence of noise or the like when the distance-bearing sensor 100 transmits and receives electromagnetic waves. The position estimation unit 102 divides a region that includes the boundaries L1 and L2 into plural small regions that enclose the line segments or the points included in the boundaries L1 and L2. Each of the plural small regions includes at least one line segment or at least two points. Further, the plural small regions overlap with each other.

Next, the position estimation unit 102 creates the first-order approximation line in each of the plural small regions that result from the division. For example, the position estimation unit 102 extends one line segment included in the small region and thereby generates the first-order approximation line. Further, the position estimation unit 102 creates the first-order approximation line such that the distance from at least two points included in the small region becomes the minimum.

The reason why the position estimation unit 102 creates the first-order approximation line for each of the small regions that overlap with each other is to avoid the detection accuracy of the crosswalk from lowering when the point or the line segment that is very distant from original boundaries of the roadway is included in the boundaries L1 and L2.

Next, the position estimation unit 102 extracts the first-order approximation lines whose slopes do not change, from the first-order approximation lines that are generated in the respective small regions, except for the first-order approximation lines parallel to the Y axis. A description will be made about extraction of the first-order approximation lines with reference to FIG. 3B.

Figure 3B:
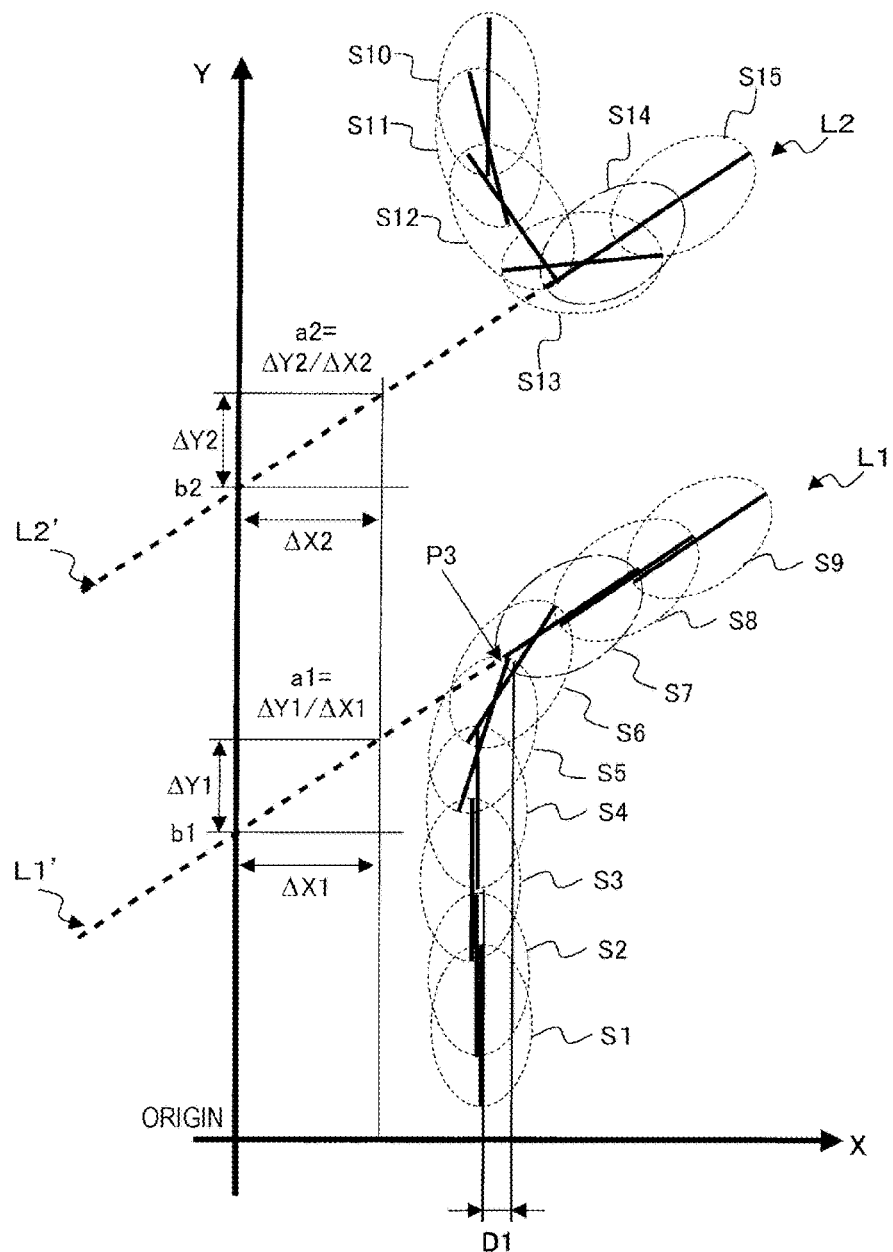
FIG. 3B illustrates one example of an extraction method of approximation lines.

FIG. 3B is a diagram that illustrates one example of an extraction method of the first-order approximation lines. FIG. 3B illustrates the respective first-order approximation lines for plural small regions S1 to S9 that result from division of the boundary L1 in FIG. 3A. Further, the respective first-order approximation lines are illustrated for plural small regions S10 to S15 that result from division of the boundary L2. For convenience of illustration, the line segments in the small regions among the first-order approximation lines that are created for the respective small regions are illustrated.

The first-order approximation lines of the small regions S1 to S4 on the boundary L1 are straight lines that are substantially parallel to the Y axis. Further, the first-order approximation lines of the small regions S5 to S7 are the straight lines whose slopes gradually change. Further, the slopes do not change through the first-order approximation lines of the small regions S7 to S9. In this case, the position estimation unit 102 extracts the first-order approximation line in the small region S7 as the first-order approximation line at which the change in the slope stops. Given that the slope of an extracted first-order approximation line L1' is set as a1 ($=\Delta Y1/\Delta X1$), the extracted first-order approximation line L1' is expressed as $y=a1 \cdot x+b1$ in the T0 coordinate plane. Note that a symbol "·" denotes multiplication.

The position estimation unit 102 calculates the difference in the slope between the respective first-order approximation lines of neighboring two small regions, for example, and determines that a change in the slope is not present when the difference in the slope is a prescribed value or lower.

The position estimation unit 102 extracts the first-order approximation line of the small region S14, as the first-order approximation line at which the change in the slope stops, on the boundary L2, similarly to the boundary L1. Given that the slope of a first-order approximation line L2' which is extracted on the boundary L2 is set as a2 ($=\Delta Y2/\Delta X2$), the extracted first-order approximation line L2' is expressed as $y=a2 \cdot x+b2$ in the T0 coordinate plane.

The position estimation unit 102 determines whether or not the difference between the slope a1 and the slope a2 of the first-order approximation lines L1' and L2' on both sides of the roadway in the destination of the right turn is a prescribed error or less. When the difference between the slope a1 and the slope a2 is the prescribed error or less, the position estimation unit 102 determines that the first-order approximation line L1 and the first-order approximation line L2' satisfy a similarity condition.

When the first-order approximation line L1' and the first-order approximation line L2' satisfy the similarity condition, the position estimation unit 102 calculates the intersecting angle $\theta=\arctan(a1)$ (or $\theta=\arctan(a2)$) of the roadway in the destination of the right turn from the slope a1 or the slope a2. Further, the position estimation unit 102 estimates a prescribed point on the first-order approximation line L1' (for example, the midpoint of the line segment in the small region S7 that corresponds to the first-order approximation line L1') as the coordinates P3 of the candidate position of the crosswalk. The coordinates P3 are a point on the first-order approximation line L1' and are represented as P3=(x3, y3). Similarly, the position estimation unit 102 estimates a prescribed point on the first-order approximation line L2' (for example, the midpoint of the line segment in the small region S14 that corresponds to the first-order approximation line L2') as the coordinates P1 of the candidate position of the crosswalk. The coordinates P1 are a point on the first-order approximation line L2' and are represented as P1=(x1, y1).

However, the position estimation unit 102 estimates that the crosswalk is present close to the coordinates P1 to P4, but it is difficult to conclude that the coordinates P1 to P4 indicate the crosswalk. That is, the position estimation unit 102 outputs the coordinates P1 to P4 as the candidate positions for estimating the positions of the crosswalk.

When the difference between the slope a1 and the slope a2 is more than the prescribed error, the position estimation unit 102 determines that the first-order approximation line L1' and the first-order approximation line L2' do not satisfy the similarity condition. In this case, the position estimation unit 102 extracts the first-order approximation lines of the small regions that neighbor the small regions which correspond to the first-order approximation lines L1' and L2' on the sides in the right-turn direction of the vehicle and determines whether or not the slopes thereof satisfy the similarity condition. For example, in FIG. 3B, because the slopes of the first-order approximation lines of the small regions S7 to S9 do not change, the position estimation unit 102 extracts the first-order approximation line of the small region S8 that neighbors the small region S7 on the side in the right-turn direction of the vehicle.

Next, the position estimation unit 102 estimates the length W2 of the crosswalk from Y-intercepts b1 and b2 of the extracted first-order approximation lines L1' and L2' as the following formula (1) (see FIG. 3B).

$$W2 = b2 - b1 \quad (1)$$

In addition, the position estimation unit 102 estimates the road width W2' of the roadway in the destination of the right turn as the following formula (2).

$$W2' = W2 \times \cos\theta \quad (2)$$

Next, the position estimation unit 102 estimates the coordinates P2 and P4 from the estimated coordinates P1 and P3, the intersecting angle θ, and the road width W2'.

A length W1 (the width of the crosswalk) of one white line of a common crosswalk is decided in accordance with the road width. For example, except for a large intersection, the length W1 is 4 m on a trunk road and 3 m on a narrow road, which is the minimum, and is a length which changes by 1 m as a unit.

The position estimation unit 102 has a table that indicates the correspondence relationship between the road width and the length of one white line and decides the length of one white line based on the estimated road width W2' in the destination of the right turn. A description will be made below about an example where the coordinates P2 and P4 are estimated while the length of one white line is set as 3 m.

The position estimation unit 102 estimates the coordinates P2 and P4 from the conditions of the estimated coordinates P1=(x1, y1) and P3=(x3, y3), the intersecting angle θ, and the length of one white line of 3 m, as the following formulas (3).

$$P2 = \{x1 + (3 \times \cos\theta), y1 + (3 \times \sin\theta)\}$$

$$P4 = \{x3 + (3 \times \cos\theta), y3 + (3 \times \sin\theta)\} \quad (3)$$

Incidentally, the free space detection unit 101 may output a boundary that is the boundary L1 or L2 in FIG. 3A which lacks a portion, as the free space information, to the position estimation unit 102. For example, when a vehicle standing still is present in a position in the vicinity of the crosswalk in the intersection, the boundary L1 or L2 in FIG. 3A lacks a portion.

In this case, it may be difficult for the position estimation unit 102 to extract the first-order approximation line on one of the boundaries L1 and L2. Even when it may be difficult to extract the first-order approximation line on one of the boundaries L1 and L2, the position estimation unit 102 estimates the candidate positions of the crosswalk from the first-order approximation line that is extracted from the other of the boundaries L1 and L2. A description will be made below about an estimation method of the candidate positions of the crosswalk when the approximation line L1' of the boundary L1: y=a1·x+b1 is extracted.

As described above, when the approximation line L1': y=a1·x+b1 is extracted, the position estimation unit 102 estimates the coordinates P3=(x3, y3) as the point on the first-order approximation line.

Next, the position estimation unit 102 calculates the intersecting angle θ=arctan(a1) of the roadway in the destination of the right turn from the slope a1 of the first-order approximation line L1'.

Next, the position estimation unit 102 estimates the length W2 of the crosswalk in the destination of the right turn and the road width W2' in the destination of the right turn. When it is difficult to extract the first-order approximation line on one of the boundaries L1 and L2, it is difficult to estimate the length W2 of the crosswalk from the Y-intercepts of the two approximation lines. In such a case, the position estimation unit 102 uses the size of the corner cut-off in the intersection to estimate the length W2 of the crosswalk.

When the size of the corner cut-off in the intersection may be known from regulations on "vehicles for which it's designed" in Article 4 of Government Order on Road Design Standards, for example, the regulations may be used, or knowledge may be obtained from map data.

That is, the size of the corner cut-off is decided in accordance with whether major vehicles that travel through the intersection are small vehicles or semitrailer trucks, for example. Here, one of the purposes of providing the corner cut-off is not to obstruct straight movement of the following vehicle even if the vehicle temporarily stops in front of the crosswalk when a pedestrian is crossing the crosswalk in the destination of the right turn of the vehicle. Thus, the corner cut-off becomes large on a national route with a wide road width in consideration of the semitrailer trucks or the like.

Thus, a size D1 of the corner cut-off illustrated in FIG. 3A is proportional to the road width W2'. The size D1 of the corner cut-off is the difference between the x coordinate of the P3 and the x coordinate of the first-order approximation line of an S1 region in FIG. 3B.

The position estimation unit 102 has a table that indicates the correspondence relationship between the length W2 of the crosswalk and the size D1 of the corner cut-off and estimates the length W2 of the crosswalk from the table and the size D1 of the corner cut-off. Then, the position estimation unit 102 uses the above formula (2) to estimate the road width W2' in the destination of the right turn from the length W2 of the crosswalk and the intersecting angle θ.

The position estimation unit 102 uses the following formulas (4) to estimate the coordinates P1, P2, and P4 from the coordinates P3=(x3, y3), the length W2 of the crosswalk, and the intersecting angle θ. Note that, in the formulas (4), a width W1 of the crosswalk (the length of one white line) is set as 3 m.

$$P2 = \{x3, y3 + W2\}$$

$$P2 = \{x3 + (3 \times \cos\theta), y3 + W2 + (3 \times \sin\theta)\}$$

$$P4 = \{x3 + (3 \times \cos\theta), y3 + (3 \times \sin\theta)\} \quad (4)$$

As described above, the position estimation unit 102 estimates the four coordinates P1 to P4 that represent the candidate positions of the crosswalk, the intersecting angle θ of the intersection, the length W2 of the crosswalk, and the road width W2' in the destination of the right turn from the boundaries L1 and L2. The position estimation unit 102 outputs each piece of information that is estimated to the coordinate calculation unit 104 and the correction unit 105. The correction unit 105 uses each of the pieces of information that are estimated to correct the basis functions that are used for detection of the crosswalk.

Next, a description will be made about the correction process of the basis functions in the correction unit 105 and the detection method of the crosswalk in the crosswalk detection unit 106.

Figure 4:
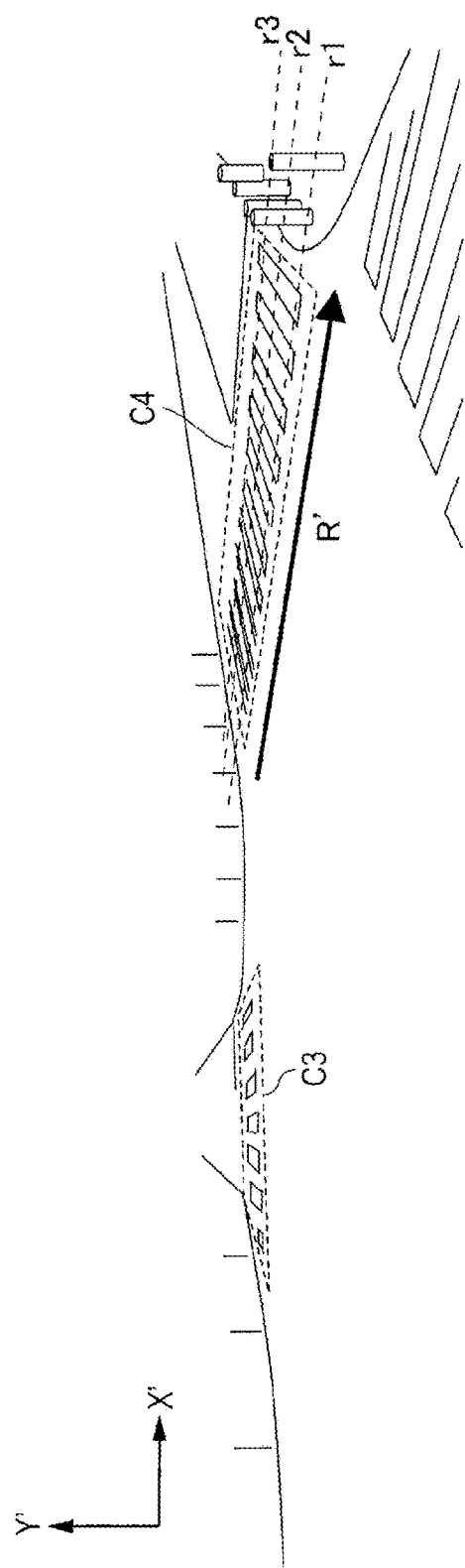
FIG. 4 illustrates one example of image data in an intersection.

FIG. 4 is a diagram that illustrates one example of the image data in the intersection. FIG. 4 illustrates the image data that are acquired by the image data acquisition unit 103 at the time point T0 in the intersection illustrated in FIG. 3A. FIG. 4 illustrates a crosswalk C3 that is present in the straight movement direction of the vehicle and a crosswalk C4 that is present in the right-turn direction of the vehicle. Note that an X' axis and a Y' axis in FIG. 4 are axes that specify the camera coordinate plane. Further, an R' axis is an axis that is specified along the crosswalk C4.

The crosswalk detection unit 106 acquires coordinates P1', P2', P3', and P4' that represent the candidate positions of the crosswalk, which result from the conversion to the camera coordinate plane, from the coordinate calculation unit 104. Further, the crosswalk detection unit 106 acquires the image data illustrated in FIG. 4 from the image data acquisition unit 103. Then, the crosswalk detection unit 106 extracts the area of the crosswalk C4, as partial data of the candidate positions of the crosswalk, from the image data.

Then, the crosswalk detection unit 106 performs the spatial frequency analysis for the luminance change of the extracted partial data and thereby detects the crosswalk. FIGS. 5A and 5B illustrate examples of the spatial frequency analysis in this embodiment. FIGS. 5A and 5B illustrate the luminance changes of the crosswalks, the basis functions of even functions and the basis functions of odd functions for performing the spatial frequency analysis for the luminance changes, and frequency intensities as analysis results.

FIG. 5A is one example of the spatial frequency analysis for the crosswalk C3 that is present in the straight movement direction of the vehicle in FIG. 4. Because the stripes of the crosswalk that is present in the straight movement direction of the vehicle are substantially parallel to the straight movement direction, as illustrated in FIG. 5A, the luminance change of the crosswalk C3 corresponds to substantially equivalent intervals. Thus, it is proper that the widths of rectangular shapes of the two basis functions correspond to substantially equivalent intervals.

FIG. 5B is one example of the spatial frequency analysis for the crosswalk C4 that is present in the right-turn direction of the vehicle in FIG. 4. The widths of the stripes of the crosswalk C4 become wider from the far side toward the near side as seen from the vehicle, that is, toward the positive direction of the R' axis in FIG. 4. Thus, as illustrated in FIG. 5B, the widths of the luminance change of the crosswalk C4 become wider from the far side toward the near side as seen from the vehicle, that is, toward the positive direction of the R' axis in FIG. 4. Thus, the correction unit 105 corrects the numbers of periods and the intervals of the widths of the rectangular shapes of the two basis functions in accordance with the movement direction of the vehicle.

Specifically, the correction unit 105 decides the number of the stripes (the number of the white lines) of the crosswalk based on the table that indicates the correspondence relationship between the road width and the white line and the length W2 of the crosswalk that is acquired from the position estimation unit 102 and sets the numbers of periods of the basis functions to the decided number of the stripes. Then, the correction unit 105 specifies the R' axis from the road width W2' and the intersecting angle θ that result from the coordinate conversion, which are acquired from the coordinate calculation unit 104. Then, the correction unit 105 estimates the change in the intervals of the stripes of the crosswalk in the camera coordinate plane and corrects the intervals of the widths of the rectangular shapes of the basis functions so as to correspond to the estimated intervals of the stripes (the estimated intervals of the white lines).

The crosswalk detection unit 106 acquires the luminance change of the crosswalk C4 along a line r2 of the crosswalk C4. The line r2 is a line along the road width direction of the crosswalk C4. The line r2 is a line that connects the midpoint between the coordinates P3' and the coordinates P4', and the midpoint between the coordinates P1' and the coordinates P2'.

The crosswalk detection unit 106 calculates the inner products between the luminance change of the crosswalk C4 that is acquired along the line r2 and the corrected basis functions. Then, the crosswalk detection unit 106 compares the calculated inner products with a prescribed threshold value and detects that the crosswalk is present when the inner products are the prescribed threshold value or higher. Then, the crosswalk detection unit 106 outputs the positions of the crosswalk, that is, the coordinates P1' to P4' to the collision inhibition device or the like, which is not illustrated.

In FIG. 5B, the description is made about a case where the crosswalk detection unit 106 acquires the luminance change in the crosswalk C4 along the line r2. However, the crosswalk detection unit 106 may acquire the luminance change in the crosswalk C4 along a line r1 or a line r3. The line r1 is a line that connects the coordinates P3' with the coordinates P4', and the line r3 is a line that connects the coordinates P1' with the coordinates P2'.

Next, a description will be made about a flow of a crosswalk detection process in this embodiment with reference to FIG. 6. FIG. 6 is a flowchart that illustrates one example of the crosswalk detection process in this embodiment. The crosswalk detection process is started at a timing at which the driver of the vehicle operates the direction indicator, for example.

The position estimation unit 102 performs a setting of coordinates that serve as a reference at the time point T0 when the crosswalk detection process is started (S101). A coordinate plane that is set at the time point T0 is based on the position of the vehicle Z at the time point T0. More specifically, the position estimation unit 102 decides the X-Y plane, of which the origin is the midpoint of the rear wheels of the vehicle Z and the Y axis direction is the movement direction of the vehicle Z at the time point T0, and which is substantially parallel to the road surface on which the vehicle Z travels, as the T0 coordinate plane.

Next, the position estimation unit 102 acquires the boundary in the present frames as the free space information from the free space detection unit 101 and updates the free space information (S102).

Next, the position estimation unit 102 performs estimation of the candidate positions of the crosswalk (S103). A description will be made about an estimation process of the candidate positions of the crosswalk in S103 with reference to FIG. 7.

FIG. 7 is a flowchart that illustrates one example of the estimation process of the candidate positions of the crosswalk in this embodiment. The estimation process of the candidate positions of the crosswalk is executed after S102.

The position estimation unit 102 divides a region that includes the boundary in the present frames which is acquired as the free space information into plural small regions (S201).

The position estimation unit 102 creates the first-order approximation line for each of the small regions (S202).

The position estimation unit 102 compares the slopes of the first-order approximation lines with each other and extracts the first-order approximation line in which the change in the slope stops, except for the first-order approximation lines substantially parallel to the Y axis (S203). The position estimation unit 102 extracts the first-order approximation lines on the both sides of the roadway in the destination of the movement direction of the vehicle.

Then, the position estimation unit 102 determines whether or not the first-order approximation lines are extracted on the both sides of the roadway in the destination of the movement direction of the vehicle (S204).

When the first-order approximation lines are extracted on the both sides (YES in S204), the position estimation unit 102 determines whether or not the extracted first-order approximation lines on the both sides satisfy the similarity condition (S205).

When the first-order approximation lines on the both sides do not satisfy the similarity condition (NO in S205), the position estimation unit 102 extracts the first-order approximation lines of the small regions that neighbor the small regions which correspond to the first-order approximation lines on the sides in the movement direction of the vehicle (S206). Then, a process of S205 is again executed.

When the first-order approximation lines on the both sides satisfy the similarity condition (YES in S205), the position estimation unit 102 calculates the intersecting angle θ from the slopes of the first-order approximation lines (S207). Then, the position estimation unit 102 estimates the coordinates that represent the candidate positions of the crosswalk from the extracted first-order approximation lines on the both sides (S208). The position estimation unit 102 outputs the candidate positions of the crosswalk to the coordinate calculation unit 104. Then, the estimation process of the candidate positions of the crosswalk (S103) is finished, and a process of S104 in FIG. 6 is executed.

In S204, when the first-order approximation lines are not extracted on the both sides (NO in S204), the position estimation unit 102 determines whether or not the first-order approximation line on one side is extracted (S209).

When the first-order approximation line on one side is extracted (YES in S209), the position estimation unit 102 calculates the intersecting angle θ from the slope of the first-order approximation line (S210). The position estimation unit 102 identifies the coordinates that represent the candidate positions of the crosswalk on the one side from the extracted first-order approximation line on the one side (S211).

Then, the position estimation unit 102 estimates the coordinates that represent the candidate positions of the crosswalk on the opposite side from the side for which the first-order approximation line is extracted, from the coordinates that are identified in S211 and the intersecting angle θ that is calculated in S210 (S212). The position estimation unit 102 outputs the candidate positions of the crosswalk to the coordinate calculation unit 104. Then, the estimation process of the candidate positions of the crosswalk (S103) is finished, and the process of S104 in FIG. 6 is executed.

In S209, when the first-order approximation line on the one side is not extracted (NO in S209), the position estimation unit 102 outputs, to the collision inhibition device or the like, which is not illustrated, information that indicates that an error occurs to position detection of the crosswalk (S213). Then, the crosswalk detection process that includes the estimation process of the candidate positions of the crosswalk (S103) in FIG. 7 is finished (a finish of FIG. 6).

Returning to the description of FIG. 6, the coordinate calculation unit 104 performs the coordinate conversion for converting the coordinates of the candidate positions P1 to P4 of the crosswalk that are represented in the T0 coordinate plane to the camera coordinate plane (S104). The coordinate calculation unit 104 outputs the candidate positions of the crosswalk that result from the coordinate conversion to the crosswalk detection unit 106.

Next, the image data acquisition unit 103 acquires the image data on the camera coordinate plane from the monocular camera (not illustrated) (S105). The image data acquisition unit 103 outputs the image data to the crosswalk detection unit 106.

The crosswalk detection unit 106 extracts the area that is indicated by the candidate positions of the crosswalk, as the partial data, from the image data (S106).

The correction unit 105 corrects the basis functions (S107).

The crosswalk detection unit 106 extracts the luminance change of the crosswalk in the partial data and calculates the inner products between the luminance change and the basis functions (S108).

The crosswalk detection unit 106 determines whether or not the calculated inner products are the threshold value or higher (S109).

When the inner products are the threshold value or higher (YES in S109), the crosswalk detection unit 106 determines that the crosswalk is present in the candidate positions of the crosswalk (S110). The crosswalk detection unit 106 outputs the positions of the crosswalk that are indicated by the candidate positions of the crosswalk, as the detection results, to the collision inhibition device or the like, which is not illustrated (S111). Then, the crosswalk detection process is finished.

When the inner product is not the threshold value or higher (NO in S109), the crosswalk detection unit 106 determines that the crosswalk is not present in the candidate positions of the crosswalk (S112). The crosswalk detection unit 106 outputs, to the collision inhibition device or the like, which is not illustrated, the detection result that the crosswalk is not present in the candidate positions of the crosswalk (S113). Then, the crosswalk detection process is finished.

As described above, in this embodiment, the position estimation unit 102 estimates at least one candidate position of the crosswalk in the movement direction of the vehicle based on the output data of the distance-bearing sensor 100 and uses the candidate positions to estimate the length of the crosswalk and the intersecting angle between the crosswalk and the roadway. Then, the correction unit 105 corrects the numbers of periods and the widths of the two basis functions that indicate the intervals of the white lines of the crosswalk and are orthogonal to each other, based on the estimated length of the crosswalk and the estimated intersecting angle. The crosswalk detection unit 106 uses the image data that include the candidate positions of the crosswalk and the two corrected basis functions to detect whether or not the crosswalk is present. The image data and the basis functions are used in the spatial frequency analysis that makes a determination about presence of a periodic change of luminance which corresponds to the stripes of the crosswalk. Accordingly, the positions of the crosswalk may be detected in a short time while an increase in the load in the signal processing is inhibited.

Further, in this embodiment, whether or not the crosswalk is present is determined by calculating the inner products between the image data and the corrected basis functions. Thus, even when the white lines of the crosswalk are partially erased or when the luminance partially does not change such as a case where a pedestrian is crossing the crosswalk, lowering of the detection accuracy may be suppressed.

Further, in this embodiment, because the crosswalk detection unit 106 narrows down the image data to an area in which the crosswalk is possibly present, the increase in the load in the signal processing may be avoided, and the positions of the crosswalk may be detected in a short time.

Further, in this embodiment, a function with rectangular waves is used as the basis function. Because the luminance change of the crosswalk is typically formed with two phases of strong and weak, the function with rectangular waves is used, and higher-order calculation may be omitted compared to a case where a trigonometric function (a sine function or a cosine function) is used. Thus, the positions of the crosswalk may be detected in a short time while the increase in the load in the signal processing is avoided.

Further, in this embodiment, when the position estimation unit 102 estimates the four coordinates that represent the candidate positions of the crosswalk based on the boundaries which are estimated by the free space detection unit 101, the two coordinates may be estimated from the boundary on one side of the both sides across the crosswalk, and the two coordinates on the other side may be estimated from the two estimated coordinates. In such a configuration, even when the boundary may not sufficiently be estimated such as a case where a vehicle is parked or stands still in the intersection, it is possible to estimate the candidate positions of the crosswalk, and the detection accuracy of the crosswalk is thus improved.

In this embodiment, a description is made about a configuration in which the image data are photographed by using the monocular camera. However, the image data may be photographed by a stereo camera.

Further, in this embodiment, a description is made about an example case where the luminance change (the intensities of luminance) of the candidate positions of the crosswalk is set as one period, the basis function that has periods which correspond to the number of periods in the candidate positions of the crosswalk. However, the present disclosure is not limited to this. For example, the correction unit 105 may use the basis function for one period and output, to the crosswalk detection unit 106, the basis function for one period that is corrected at each time based on the candidate positions and the intersecting angle of the crosswalk, and the crosswalk detection unit 106 may calculate the inner products between the luminance change of the candidate positions of the crosswalk and the corrected basis functions for one period.

In the foregoing, various embodiments have been described with reference to the drawings. However, it is matter of course that the present disclosure is not limited to such examples. It is clear that a person skilled in the art may conceive various variations and modifications within the scope described in the claims, and it is of course understood that those belong to the technical scope of the present disclosure. Further, elements in the above embodiment may be arbitrarily combined in the scope that does not depart from the gist of the present disclosure.

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure may be used for detection of a crosswalk on a road surface on which a vehicle travels and is useful for a system that is for preventing an accident by detection of a crosswalk and is installed in a vehicle, for example.

What is claimed is:

1. A detection device comprising:
   a distance-bearing sensor, which, in operation, transmits an electromagnetic wave and receives the electromagnetic wave that is reflected from an object;
   a position estimator, which, in operation, estimates, based on the received electromagnetic wave, at least one candidate position of a crosswalk in a movement direction of a vehicle and estimates a length of the crosswalk and an intersecting angle between the crosswalk and a roadway using the estimated at least one candidate position;
   a corrector, which, in operation, corrects the numbers of periods and widths of two basis functions based on the estimated length of the crosswalk and the estimated intersecting angle, the two basis functions corresponding to intervals of white lines of the crosswalk and being orthogonal to each other; and
   a crosswalk detector, which, in operation, detects whether or not the crosswalk is present using both image data which include the at least one candidate position and the two corrected basis functions.

2. The detection device according to claim 1,
   wherein the position estimator, in operation, divides a region that includes a boundary between the roadway and an outside of the roadway into plural small regions, generates a first-order approximation line based on portions of the boundary, each of the portions corresponding to each of the plural small regions, and estimates the at least one candidate position based on a change in a slope of the first-order approximation line.

3. The detection device according to claim 2,
   wherein the position estimator, in operation, extracts the first-order approximation line having difference in slope between two of the plural regions adjacent each other and equal to or less than a prescribed value, estimates coordinates on the extracted first-order approximation line as coordinates that represent the at least one candidate position, estimates the length of the crosswalk using the coordinates that represent the at least one candidate position, and estimates the intersecting angle from the slope of the extracted first-order approximation line.

4. The detection device according to claim 3,
wherein the numbers of periods of the corrected basis functions are the same as the number of the white lines of the crosswalk, the number of the white lines being calculated based on the length of the crosswalk.

5. The detection device according to claim 2, comprising:
a free space detector, which, in operation, estimates the boundary based on a wave which is reflected from the object.

6. The detection device according to claim 1,
wherein the position estimator, in operation, estimates coordinates of the at least one candidate position in a bearing-distance plane,
the detection device includes a coordinate calculator, which, in operation, converts the estimated coordinates to coordinates in a photographed region plane of the image data, and
the crosswalk detector, in operation, detects whether or not the crosswalk is present using an area that is surrounded by the coordinates in the photographed region plane of the image data.

7. The detection device according to claim 1,
wherein the at least one candidate position includes two candidate positions across the crosswalk, and
the position estimator, in operation, based on an estimation of one of the two candidate positions, estimates another of the two candidate positions.

8. A detection method comprising:
transmitting an electromagnetic wave and receiving the electromagnetic wave that is reflected from an object;
estimating, based on the received electromagnetic wave, a candidate position of a crosswalk in a movement direction of a vehicle and estimating a length of the crosswalk and an intersecting angle between the crosswalk and a roadway using the estimated candidate position;
correcting the numbers of periods and widths of two basis functions based on the estimated length of the crosswalk and the estimated intersecting angle, the two basis functions corresponding to intervals of white lines of the crosswalk and being orthogonal to each other; and
detecting whether or not the crosswalk is present using both image data that include the candidate position and the two corrected basis functions.

\* \* \* \* \*